UNITED STATES PATENT OFFICE

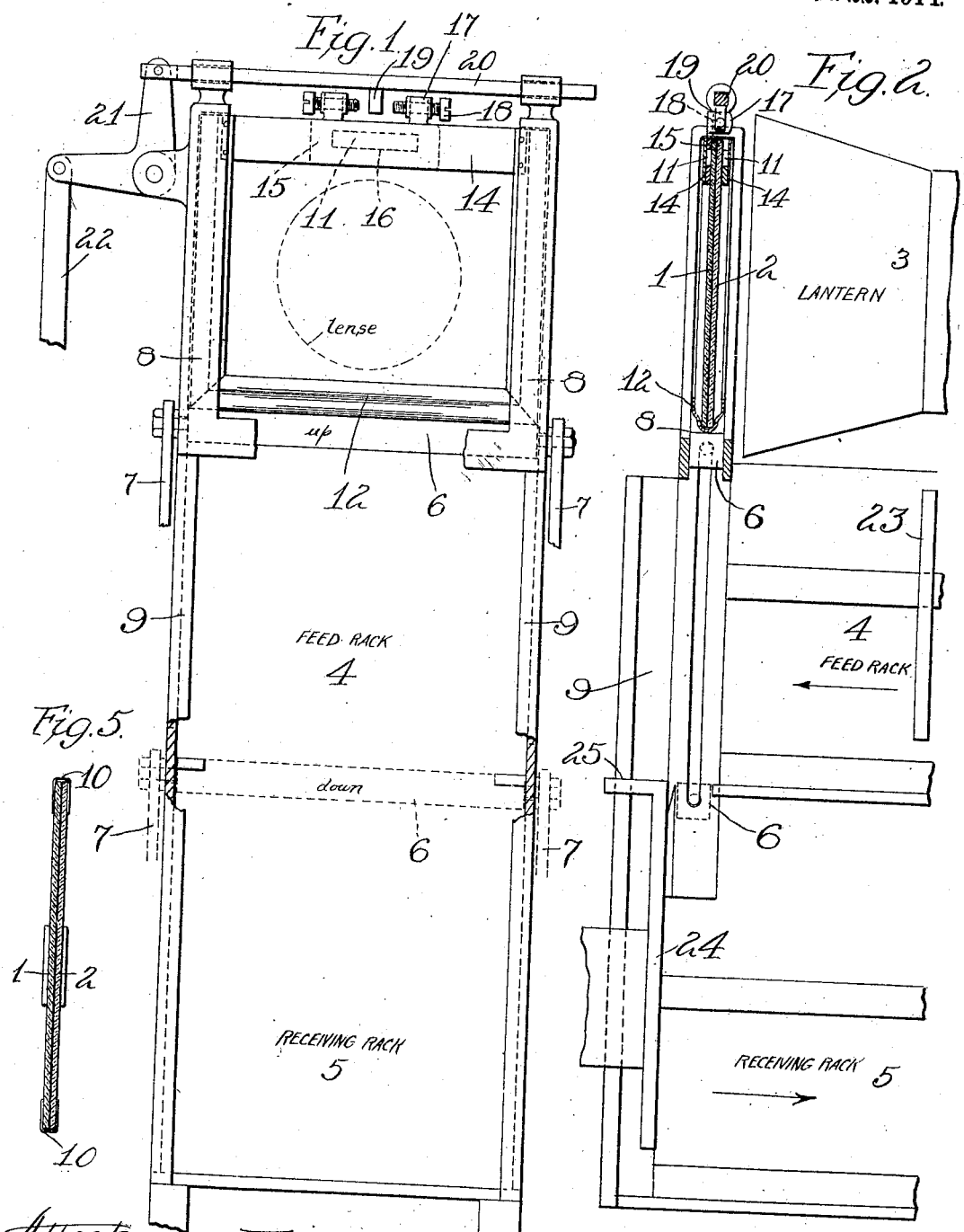
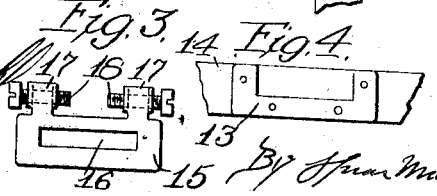

JAMES F. TILLEY, OF WASHINGTON, DISTRICT OF COLUMBIA, AND SYDNEY B. AUSTIN, OF BALTIMORE, MARYLAND, ASSIGNORS, BY MESNE ASSIGNMENTS, TO MOTT-LE-GAIGE ANIMATED ADVERTISING CORPORATION, OF NEW YORK, N. Y.

AUTOMATIC DISPLAY APPARATUS.

1,111,625.  Specification of Letters Patent.  Patented Sept. 22, 1914.

Application filed April 3, 1912, Serial No. 688,346. Renewed August 17, 1914. Serial No. 857,265.

*To all whom it may concern:*

Be it known that we, JAMES F. TILLEY and SYDNEY B. AUSTIN, citizens of the United States, residing at Washington, District of Columbia, and Baltimore, Maryland, respectively, have invented certain new and useful Improvements in Automatic Display Apparatus, of which the following is a specification.

Our invention relates to display apparatus for use in advertising moving picture shows or in like situations, whereby motion picture effects can be secured from a composite picture slide.

The invention belongs to that class of display devices disclosed in an application for Letters Patent of the United States of A. S. Spiegel, #607,667, filed February 9, 1911.

Our object is to provide an apparatus for use with the said slides in series or one after the other, and operate them automatically so that by charging the apparatus with a number of the slides and setting it in operation no further attention will be required on the part of an attendant, as the machine will perform its operations automatically and display one slide after the other throughout the whole series, and repeat these operations as long as may be desired.

The invention consists in the features and combination and arrangement of parts hereinafter described and particularly set forth in the appended claims.

In the accompanying drawings Figure 1 is a front view of an apparatus embodying our invention; Fig. 2 is a side view with parts in section; Figs. 3 and 4 are detail views, and Fig. 5 is a sectional view through the composite slide taken at right angles to that shown in Fig. 2.

The composite slide is composed of two transparent members, as 1, 2, one of these members having a series of fine parallel lines to form a grating or screen with clear spaces in between, and the other bearing the composite picture composed of different groups of lines so that by shifting one member of the slide in relation to the other the different groups of lines or different portions of the composite picture will be displayed through the clear spaces of the screen, and this being done in front of a lantern, the picture will be displayed on the receiving screen, and then by shifting one of the members of the composite slide in relation to the other, the first group of lines or portion of the picture will be hidden behind the screen or grating, and another portion or group of lines will be displayed, and this group of lines will represent the same object or picture, but in a different position from that first displayed, and so a motion picture effect will be secured.

Our present apparatus embodies a lantern shown generally at 3, a suitable feed rack 4 upon which the composite slides are placed, and a receiving rack 5 for receiving the composite slides. A suitable plunger is provided to move the slides from the feed rack 4 into position over a carrier 6, which is moved by arms or links 7 driven from any suitable power transmitting member or portion of the automatic apparatus so that the slide will be moved by this carrier along a guideway 8 into position in front of the lantern, as shown in Fig. 2. One of the slides is shown in this position in said figure. After being displayed, the carrier 6 lowers to bring the slide opposite the feed rack 4, so that the next action of the feed plunger to bring a fresh slide over the carrier 6 will cause the used slide to be moved into the guideway 9, so that it may pass along this guideway to a position opposite the receiving rack 5, whereupon a plunger will push this slide into the receiving rack. The arrangement of these racks and the transfer mechanism between them forms no part of our invention, such mechanism being old in the art whereby a slide is transferred from one rack to the other.

As shown in Fig. 5, the composite slide is formed by the two members 1, 2, connected at their opposite ends by strips of flexible material 10 which will allow one member to move in relation to the other. These members, at their upper ends, are provided with lateral projections 11, and each composite slide is contained in a holder or casing 12 of sheet metal in the form of a frame open at the center to allow full exposure of the slide. This frame is provided at its upper part with a clip 13 of general U-shape riveted or secured to one of the upper cross bars 14 of the frame, and on the inner side thereof. This U-shaped clip receives one of the projections 11 which is long enough to occupy the space from one arm of the U-shape member to the other, so that this member of the slide will be held against movement. The projection 11 on the other member of the composite slide is engaged by a clip 15 having an opening 16 to receive said member, this clip extending above the composite slide and having arms or studs 17 with abutment screws 18 adjustably mounted therein. It will be understood that each composite slide is held in its own casing, and in the movement of the composite slide from place to place the casing is moved, together with the clip 15, as one body. When a composite slide with its casing is moved up opposite the lantern, the abutment screws 18 thereof will be brought into position on opposite sides of a lug 19 carried by a bar 20 slidably mounted in the frame of the apparatus, and reciprocated through any suitable connections to a driving member or other moving part of the automatic apparatus, these connections, as a representative form, being shown herein as a bell crank 21 and a link 22. As the bar 20 reciprocates, its lug 19 will impart movement to that member of the composite slide which carries the clip 15, so that the motion picture effect will be secured as above described. It will be understood that the apparatus described is representative of different forms of machines which may be used for the purpose.

The plunger for the feed rack is indicated generally at 23, while the plunger for the receiving rack is indicated at 24, this latter plunger having a ledge or extension 25 for supporting the casings with their slides when they are moved into the channel 9, it being understood that the slide which has been used is moved into the channel 9 when a fresh slide is moved over the transfer device 6. The plunger 24, when retracted, allows the used slide to fall down the channel 9 opposite the receiving rack, and when the plunger 24 advances, this slide is moved into the receiving rack to be used again, it being understood that the slides from the receiving rack are transferred automatically into the feed rack by any suitable mechanism.

We claim as our invention:

1. In combination in a display apparatus, a series of composite slides each composed of a transparent picture carrying member and a screen member, transfer mechanism for moving the composite slides automatically to and from the display point, and means for automatically operating the composite slide while at said display point to produce motion picture effects, substantially as described.

2. In combination in a display apparatus, transfer mechanism for moving composite picture slides to and from a point to be displayed, operating mechanism for moving one member of the composite slide relatively to the other, with means of connection between the slide and said operating mechanism, said means of connection being engaged by the operating mechanism when the composite slide is moved to the display point, and disengaged therefrom when the slide is moved away from the display point, substantially as described.

3. In combination with composite slides, casings for holding said slides, one member of each slide being movable in relation to the other, and operating means for actuating the slide when the said slide is moved to the point of display, and automatically operating transfer mechanism to move the casings to and from said point, substantially as described.

4. In combination a series of composite slides, each composed of a transparent picture carrying member, and a transparent screen member, one movable relatively to the other, a display device, mechanism operating automatically for moving one member of the slide in relation to the other, and automatically operating transfer mechanism to move the composite slide into and out of engaging position with the operating mechanism, substantially as described.

5. In combination a series of composite slides each composed of two members one movable in relation to the other, casings to receive the slides having means to engage one slide member to retain it against movement, transfer mechanism to move the casings to and from a display point, and automatically operating mechanism for the other slide member when the casings are moved to the display point, substantially as described.

In testimony whereof, we affix our signatures in presence of two witnesses.

JAMES F. TILLEY.
SYDNEY B. AUSTIN.

Witnesses for James F. Tilley:
  JAMES M. SPEAR,
  BENNETT S. JONES.
Witnesses for Sydney B. Austin:
  WALTER DONALDSON,
  BENNETT S. JONES.